(12) United States Patent
Briscoe et al.

(10) Patent No.: US 7,464,402 B2
(45) Date of Patent: Dec. 9, 2008

(54) AUTHENTICATION OF NETWORK USERS

(75) Inventors: Robert J Briscoe, Ipswich (GB); Andrea Soppera, Ipswich (GB)

(73) Assignee: British Telecommunications public limited company, London (GB)

( * ) Notice: Subject to any disclaimer, the term of this patent is extended or adjusted under 35 U.S.C. 154(b) by 575 days.

(21) Appl. No.: 10/389,901

(22) Filed: Mar. 18, 2003

(65) Prior Publication Data
US 2004/0187024 A1 Sep. 23, 2004

(51) Int. Cl.
*G06F 21/20* (2006.01)
*H04L 9/32* (2006.01)

(52) U.S. Cl. .......................................................... 726/5
(58) Field of Classification Search ........................ None
See application file for complete search history.

(56) References Cited

U.S. PATENT DOCUMENTS

| | | | |
|---|---|---|---|
| 6,026,163 A | 2/2000 | Micali | |
| 6,092,196 A * | 7/2000 | Reiche | 726/6 |
| 6,119,230 A * | 9/2000 | Carter | 726/5 |
| 6,259,909 B1 | 7/2001 | Ratayczak et al. | |
| 6,609,198 B1 * | 8/2003 | Wood et al. | 713/155 |
| 6,760,841 B1 * | 7/2004 | Fernandez | 713/172 |
| 6,957,334 B1 * | 10/2005 | Goldstein et al. | 713/170 |
| 7,080,404 B2 * | 7/2006 | Abdo et al. | 726/3 |
| 7,137,006 B1 * | 11/2006 | Grandcolas et al. | 713/180 |
| 7,139,917 B2 * | 11/2006 | Jablon | 713/183 |
| 7,266,837 B2 * | 9/2007 | Monjas-Llorente et al. | 726/2 |
| 2001/0032310 A1 * | 10/2001 | Corella | 713/156 |
| 2002/0004832 A1 | 1/2002 | Yoon et al. | |
| 2002/0016777 A1 * | 2/2002 | Seamons et al. | 705/76 |
| 2002/0108061 A1 * | 8/2002 | Harrison et al. | 713/201 |
| 2002/0178385 A1 * | 11/2002 | Dent et al. | 713/202 |
| 2003/0002496 A1 * | 1/2003 | Beier | 370/389 |
| 2003/0037131 A1 * | 2/2003 | Verma | 709/223 |
| 2003/0065940 A1 * | 4/2003 | Brezak et al. | 713/201 |
| 2003/0130960 A1 * | 7/2003 | Fraser et al. | 705/75 |
| 2003/0177351 A1 * | 9/2003 | Skingle | 713/156 |

(Continued)

FOREIGN PATENT DOCUMENTS

EP 1043648 A2 10/2000

(Continued)

OTHER PUBLICATIONS

Schneier, "Applied Cryptography, Second Edition", 1996, John Wiley & Sons, Inc., pp. 34-38.*

(Continued)

*Primary Examiner*—Christopher A Revak
(74) *Attorney, Agent, or Firm*—Nixon & Vanderhye P.C.

(57) ABSTRACT

A network includes a server and a number of clients, which will in operation of the network require authentication by the server. The server distributes authentication information to other clients when a session is initialized. When the server needs to authenticate a client, it hands out a server request to the client which asks client for authentication information which it must obtain from other clients. The client to be authenticated then sends these requests to the clients specified in the authentication request to obtain the authentication information from those clients. Once the client to be authenticated has received the relevant authentication information from the other clients it returns it to the server and is authenticated or not accordingly.

26 Claims, 5 Drawing Sheets

Server                                                                                                                    Client H(M, Secret_Client_A_ID, Secret_Client_A_sec, t), t, TCl, M  →   Forward the request to other clients H(M, Answer, Secret_Client_A_ID, Secret_Client_A_Sec, t), TCl, t, M, Answer   ← Collecting of the secrets and sending the answer Match the two signatures. If yes process the packet

U.S. PATENT DOCUMENTS

2004/0111621 A1* 6/2004 Himberger et al. .......... 713/182

FOREIGN PATENT DOCUMENTS

| | | |
|---|---|---|
| JP | 2001-265694 | 9/2001 |
| WO | WO 99/56194 | 11/1999 |
| WO | WO 01/77797 A2 | 10/2001 |

OTHER PUBLICATIONS

Internet Engineering Task Force, Request for Comment (RFC) 2522, Karn, P., Simpson, W., "Photuris: Session-Key Management Protocol", Mar. 1999.

Lou, W. et al., "A Multipath Routing Approach for Secure Data Delivery", *IEEE Military Communications Conference (MILCOM 2001)*, pp. 1467-1473 (2001).

Oppliger, R., "Protecting Key Exchange and Management Protocols Against Resource Clogging Attacks", *Proceedings of the IFIP TC6/TC11 Joint Working Conference on Secure Information Networks: Communications and Multimedia Security* (1999).

Schneier, B., Applied Cryptography, Second Edition, pp. 70-73.

Zhou, L. et al., "Securing Ad Hoc Networks" *IEEE Network*, pp. 24-30 (1999).

* cited by examiner

| % malicious user | % of secret requests that fail |
|---|---|
| 1 | 3 |
| 2 | 5.93 |
| 3 | 8.81 |
| 4 | 11.63 |
| 5 | 14.40 |
| 10 | 27.34 |
| 15 | 38.91 |
| 20 | 49.18 |
| 40 | 78.83 |
| 50 | 87.87 |

AUTHENTICATION OF NETWORK USERS

BACKGROUND

1. Technical Field

The present invention relates to a method of and an apparatus for the authentication of users of a network. It has particular application for IP (Internet Protocol) networks, but is equally applicable to other networks where a given network entity may wish to authenticate a second network entity (e.g. with which it is communicating).

2. Related Art

It is common in networks for one user or entity on the network to wish to be able to authenticate another user or entity on the network. For example, two network users wishing to communicate with each other may first wish to authenticate the other user to confirm that they are communicating with a legitimate network user (and/or with who they think they are communicating with). A network server may wish to authenticate a client computer before, for example, granting the client computer communications access or resources on the network.

Any such authentication process must be able to confirm a legitimate user, but not be susceptible to a malicious user masquerading as a legitimate user ("spoofing"). Existing authentication procedures therefore typically involve encryption and the passing of passwords and/or encryption keys, etc, that should only be known to, or derivable by, legitimate users of the network.

However, the Applicants have recognised that in some cases it may not always be desirable to have to use cryptographic algorithms, passwords and stored cryptographic keys for authentication procedures. There therefore remains a need for an authentication process that does not have to rely on, for example, encryption for its security.

BRIEF SUMMARY

According to a first aspect of the present invention, there is provided a method of authenticating an entity on a network used by plural network entities, the method comprising:

an authenticating network entity instructing the entity to be authenticated to obtain authentication information from one or more other network entities;

the entity to be authenticated obtaining the authentication information from said one or more other network entities and sending that authentication information to the authenticating network entity; and the authenticating network entity authenticating or otherwise the entity to be authenticated on the basis of the authentication information it is sent.

The authentication procedure of the present invention involves the entity to be authenticated seeking authentication information from one or more other network entities. In other words, the authenticating network entity in effect uses one or more third party network entities in the process to authenticate the entity to be authenticated. The authentication procedure is therefore a distributed one and involves more than just the authenticating network entity and entity to be authenticated. It is therefore effectively "multi-end-to-end", rather than the more usual "end-to-end" authentication processes where only the authenticating entity and the entity to be authenticated are involved.

The advantage of using a distributed authentication process in the manner of the present invention is that the authentication process requires information from plural network entities, which information can therefore be requested and sent over many different paths in the network. This makes it more difficult for an attacker to be able to intercept ("sniff") all of the relevant authentication traffic to allow them to masquerade successfully as a legitimate user of the network. This makes the authentication process relatively secure, without the need to use, for example, further security measures such as encryption of authentication traffic or information and the use of passwords (which can therefore be avoided altogether, if desired). The invention exploits the fact that the complex topology of typical networks means that authentication messages from different sources will follow diversified paths on the network, thereby making the interception of all the authentication messages difficult.

In a preferred embodiment the authentication information comprises one or more pieces of information that is stored by said one more other network entities wherein each piece of authentication information is only valid for a limited period of time. This helps to enhance the security of the process since after such a period of time each piece of authentication information would have to be replaced with new, valid pieces of authentication information.

Preferably the method further comprises at least one distributor network entity distributing authentication information to the one or more other network entities by a plurality of distributor network entities. This helps, for example, to reduce the threat of an attacker being able to place a "sniffer" directly in front of a distributing network entity and thereby intercept all of the authentication information distributed in the network. In another preferred embodiment the authentication information is distributed in plain text. This is possible because as discussed above the present invention provides sufficient security that encryption can be unnecessary. Not using encryption simplifies the authentication procedure.

Further embodiments that add to the security of the process include:

the method further comprises the distributor network entity first verifying the one or more other network entities that it is distributing the authentication information to, and then, once it has verified the one or more other network entities, transmitting the authentication information to the one or more other network entities.

the method further comprising the entity to be authenticated verifying the authentication instruction received from the authenticating network entity before responding to that instruction.

the method further comprising the authenticating network entity including with the authentication instruction verification information that the entity to be authenticated can return to the authenticating network entity with its response to the authentication instruction to allow the authenticating network entity to verify that response as being in answer to the authentication instruction.

the method further comprising the authenticating network entity determining the time delay between its authentication instruction and the response from the entity to be authenticated, and rejecting the response if the response is returned outside a predetermined period of time from the original instruction.

In another preferred embodiment, the authentication takes place via an intermediate network entity which modifies the authentication process wherein the authentication instruction from the authenticating network entity is sent to the entity to be authenticated via the intermediate network entity which modifies that instruction, and further comprising the entity to be authenticated answering this modified instruction and returning its response, and the intermediate network entity intercepting the response and modifying it appropriately before returning it to the authenticating network entity. This arrangement further enhances the security of the process, since, for example, an attacker intercepting the initial authentication request message or the network entity's response, may still not know which intermediate network entity to send its messages via for the necessary modification and/or be able to ascertain what the necessary modification for correct authentication is.

According to a second aspect of the present invention there is provided a network comprising:

an authenticating network entity comprising means for authenticating network entities, including:

means for instructing a network entity to be authenticated to obtain and send to it authentication information from one or more other network entities and means for authenticating or otherwise the network entity to be authenticated on the basis of the authentication information it sends; said one or more other network entities each comprising means for storing authentication information and for sending that information to said network entity to be authenticated.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a network, network entity, server or client computer comprising data processing means causes in conjunction with said data processing means said entity, etc, to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

According to a third aspect of the present invention there is provided a computer program element comprising computer software code portions for performing the method of any one of claims 1 to 20 when the program element is run on data processing means.

According to a fourth aspect of the present invention there is provided a method of authenticating an entity on a network used by plural network entities, the method comprising:

an authenticating network entity instructing the entity to be authenticated to obtain authentication information from one or more other network entities;

the entity to be authenticated obtaining the authentication information from the other network entity or entities and sending that information to the authenticating network entity; and the authenticating network entity authenticating or not the entity to be authenticated on the basis of the authentication information it is sent.

BRIEF DESCRIPTION OF THE DRAWINGS

A number of preferred embodiments of the present invention will now be described by way of example only and with reference to the accompanying drawings, in which.

DETAILED DESCRIPTION OF EXEMPLARY EMBODIMENTS

A preferred embodiment of the present invention in which it is implemented in an IP (Internet Protocol) network will now be described. However, as will be appreciated by those skilled in the art, the present invention is applicable to all networks, and not just IP networks.

Figure 1:
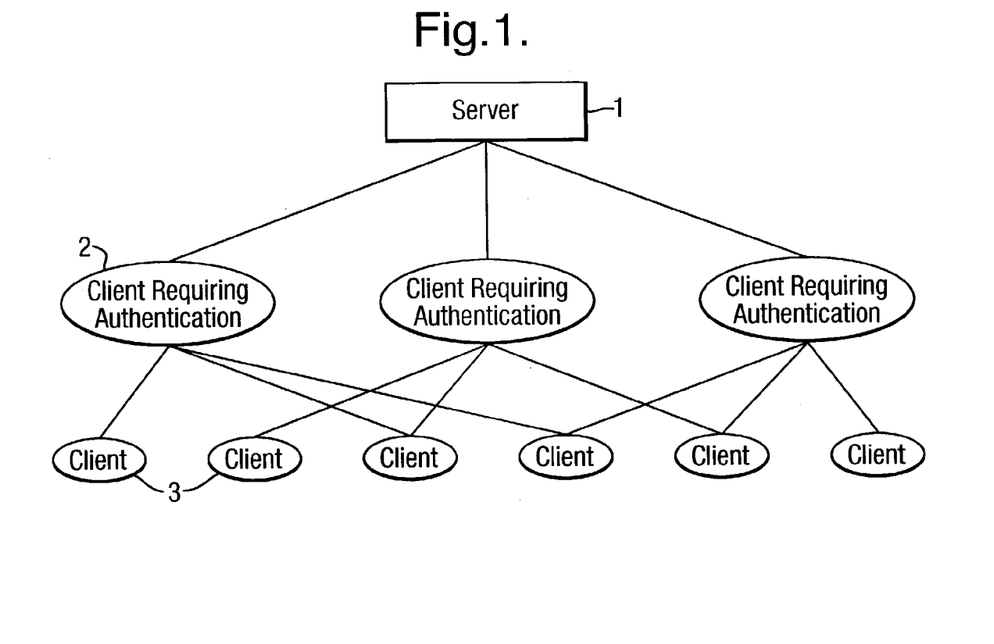
FIG. 1 shows schematically a network to which the present invention can be applied.

FIG. 1 shows schematically an IP network including a plurality of network entities. Specifically, the network includes a server 1 which is the core of the system and the network entity whose security and function it is important to preserve. The server 1 acts to monitor the network in order to discover if there are malicious users.

The network includes a number of clients 2, some of which will, during operation of the network, require authentication by the server 1. It will be realised, however, that in other embodiments the network may also include other types of entity (e.g. other servers) that require authentication. In the present embodiment this authentication is effected by the server 1 asking the client to be authenticated to seek authentication information from other clients of the network 3. The operation of this process will now be described.

Before the authentication procedure can take place, it is necessary to distribute authentication information in the form of an appropriate client "secret" to each client of the network.

Figure 2:
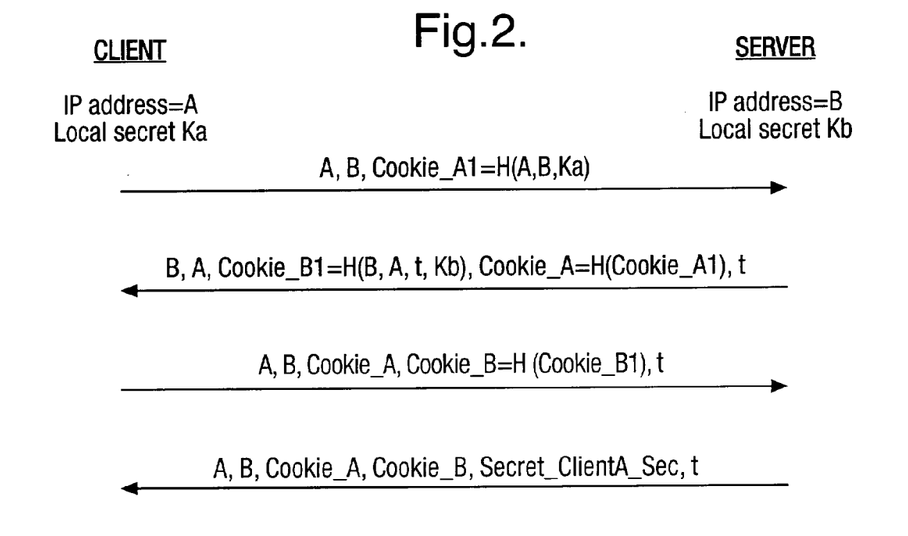
FIG. 2 shows schematically the exchange of messages as authentication information is distributed in a preferred embodiment of the present invention.
Figure 3:
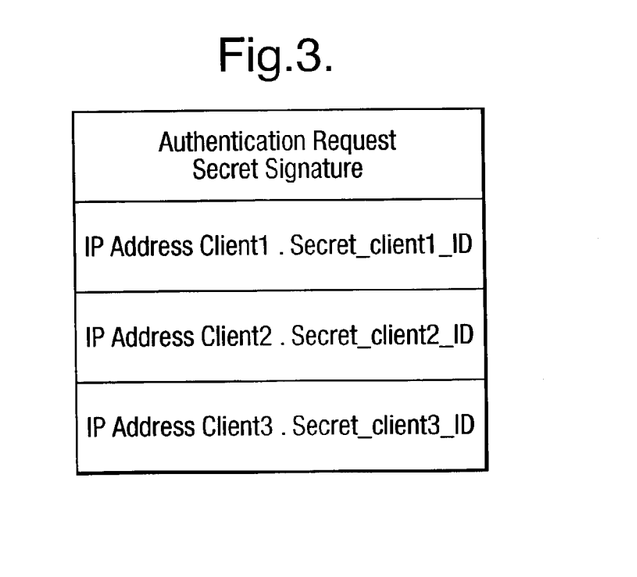
FIG. 3 shows a preferred embodiment of an authentication request message.

FIG. 2 shows in more detail the exchange of messages as the authentication information is distributed. It is assumed that the exchange of messages takes place between a server having the network (IP) address B and storing a unique local secret Kb, and a client having a network (IP) address A and storing a unique local secret Ka.

It is also assumed in FIG. 2 that this exchange of messages for distributing the authentication information takes place upon initialisation of communication between the server and the client, with the client initiating the communication. (However, as will be appreciated by those skilled in the art, the exchange of messages could take place generally speaking as and when desired).

This distribution is done by the server 1, and uses a "cookie" exchange technique to allow the server and client to first verify each other. This helps to, for example, guard against flooding attacks. A flooding attack is one where a large amount of data is sent to a user in an attempt to annoy them, lock their terminal, or to overflow their network buffer and thus lose their network connection. After the cookie exchange and verification, the server sends the authentication information (client secret) to the client. In the present embodiment, the authentication information takes the form of a "client secret" that is stored by each client of the network and is known only to that client and the authenticating server. Each client stores a different such secret. Each client secret comprises a random number of 64 bits (although any form of authentication information could be used). The client secrets are limited in time, i.e. they have a predetermined lifetime after which they expire and are replaced by a new secret. This enhances the security of the arrangement.

As shown in FIG. 2, the client first creates a cookie, Cookie_A1, which it sends to the server together with the server's IP address B and the client's IP address A. The cookie, Cookie_A1 comprises a hash of the server's IP address B, the client's IP address A and the local secret Ka of the client. (A hash function is a function, mathematical or otherwise, that takes a variable-length input string and converts it to a fixed length (generally smaller) output string called a hash value.) This ensures that the cookie depends on the specific parties involved in the message exchange and can only be generated by the particular, issuing network entity, i.e. the client since it uses that client's local secret Ka. It should also be noted that this message is not verified and only requires a small processing overhead of the hash function. Furthermore, the client does not store the cookie hence there is no resource allocation at the client and the operation is stateless (i.e. having no information about what occurred previously) up until this stage.

Upon receipt of this message, the server sends the client a message of its own including a cookie of its own, Cookie_B1. The server's cookie, Cookie_B1, comprises the hash of the server's IP address B, the client's IP address A, the current time parameter t and the server's local secret Kb. This again means that the server's cookie depends on the specific parties involved in the message exchange and can only be generated by the server itself. The use of the time parameter also helps to ensure the unrepeatability of the cookie. The cookie will also be different for each client, since it depends on the client's network address as well as the time parameter t.

The server's message also includes the current time parameter t, and is signed with a cookie_A, comprising a hash of the client's cookie, Cookie_A1. This allows the client to verify that the message is from the server by regenerating its cookie, Cookie_A1, operating upon it using the same hash function as the server, and comparing it with the server's "signature".

The server's cookie, Cookie_B1, sent to the client serves as a secret client identity or ID, which can be used in the future as verification information to verify and sign messages exchanged between the server and the client.

This verification information (secret client ID) therefore has to be stored by the client. It also has to be stored by the server for each client. This is done in the present embodiment by the server storing the time parameter t used to generate the cookie against the relevant client (e.g. its network address) to allow it to recreate the cookie when necessary. This means that in the present embodiment for each new connection the server (only) additionally stores the time parameter t to allow it to recover the verification information sent to a given client.

It should be noted that although in the present embodiment the verification information corresponds to the first server cookie that initiates the communication, this is not necessary, and other verification information, for example comprising a further cookie, could be sent and used if desired.

If, after comparing its own cookie_A1 with the server's signature, the client verifies the server's message, it then acknowledges it, by returning a message that includes the server's signature (the cookie, Cookie_A), the time parameter t, and is signed with a cookie, Cookie_B comprising a hash of the server's cookie, Cookie_B1. The server verifies this message by regenerating its cookie, Cookie_B1, and then creating its own version of the signature cookie, Cookie_B. If the two versions of Cookie_B match then the server can send the authentication information (client secret, Secret_Client_A_sec) to the client. The authentication information is generated using appropriate secret information stored by the server and the current time parameter t. In the present embodiment it comprises a 64-bit number generated from this information, although it can take other forms, if desired. This distribution message is again signed with the appropriate cookies, Cookie_A and Cookie_B, for verification purposes.

The client stores the transmitted authentication information, secret_client_A_sec.

The server caches the connection parameter (network address, port number) of the relevant client, the time parameter t used to create the first cookie (cookie B_1) and the client's secret information, so as to allow it to recreate that information as necessary. So as to keep this process stateless as far as possible, this information is preferably stored using a resource already allocated for a statefull connection. This will often be possible, since normally if a server asks the client for authentication information, it will have a general statefull connection (e.g. a TCP connection) open with the client. In that case, the time information can be stored with the parameters regarding that statefull connection.

This process is repeated to distribute appropriate authentication information, in the form of client secrets, to all the relevant clients in the network.

Each piece of authentication information (client secret) and verification information (secret client ID) and token (cookie) only has a limited period of validity and so is replaced by new such information in a further message exchange at appropriate intervals. This further enhances the security of the system. The validity period and changing of the information is varied according to one or more predetermined criteria relating to the state of the network. For example, if a predetermined alert situation is detected, the rate of renewal of the information is increased. The rate of authentication requests from the server could also be varied along similar lines, if desired.

It will be seen from the above that the message exchange and distribution of authentication information is carried out unencrypted. However, encryption could be used if desired to further enhance security. If encryption is used, then preferably a public-key encryption algorithm (sometimes called an asymmetric encryption algorithm) is employed.

Although the present embodiment shows a single server distributing the authentication information, it would be possible for more than one server to do so, and indeed that may be preferable. An advantage of using more than one server to distribute the authentication information is that an attacker who manages to place a sniffer (a program used to capture data) in front of a distributing server may not be able to intercept all the authentication information distributed in the network.

Once the authentication information has been distributed, authentication can take place.

The authentication process can be initiated as desired, for example, it could be initiated whenever an entity connects to the network or requests new resources on the network. Alternatively or additionally, it could be initiated when a relevant network entity, e.g. server, suspects a problem or malicious user (and therefore wishes to verify one or more existing network users). Preferably the rate of authentication requests is variable, and depends on, for example, the detected state of the network. Thus, for example, the rate of authentication requests could be increased if a threat to the network is perceived. When it is desired to authenticate a client, the server sends an authentication request message requesting from that client authentication information which is stored by other clients on the network.

The authentication request message from the server includes the IP addresses and secret client IDs for each client from which the client being authenticated is to seek authentication information. It ill be remembered that the secret client Ids serve as verification information.

In the present embodiment, the client being authenticated is instructed to seek authentication information from three other clients of the network, although other numbers of clients could be used, if desired. The clients selected are preferably chosen randomly. The number of network entities from which authentication information is sought could depend on, for example, the size and/or structure of the network, the number of network entities using this method, and/or the permitted traffic overload. Authentication information is not sought from network entities known or thought to be (e.g. based on their previous actions) "malicious" (i.e. liable to return incorrect authentication information). This helps to avoid such "malicious" entities causing a breakdown of the authentication process. Thus only network entities known or believed to be reliable and/or secure are chosen to be in the group of network entities from which authentication information is to be sought.

Figure 4:
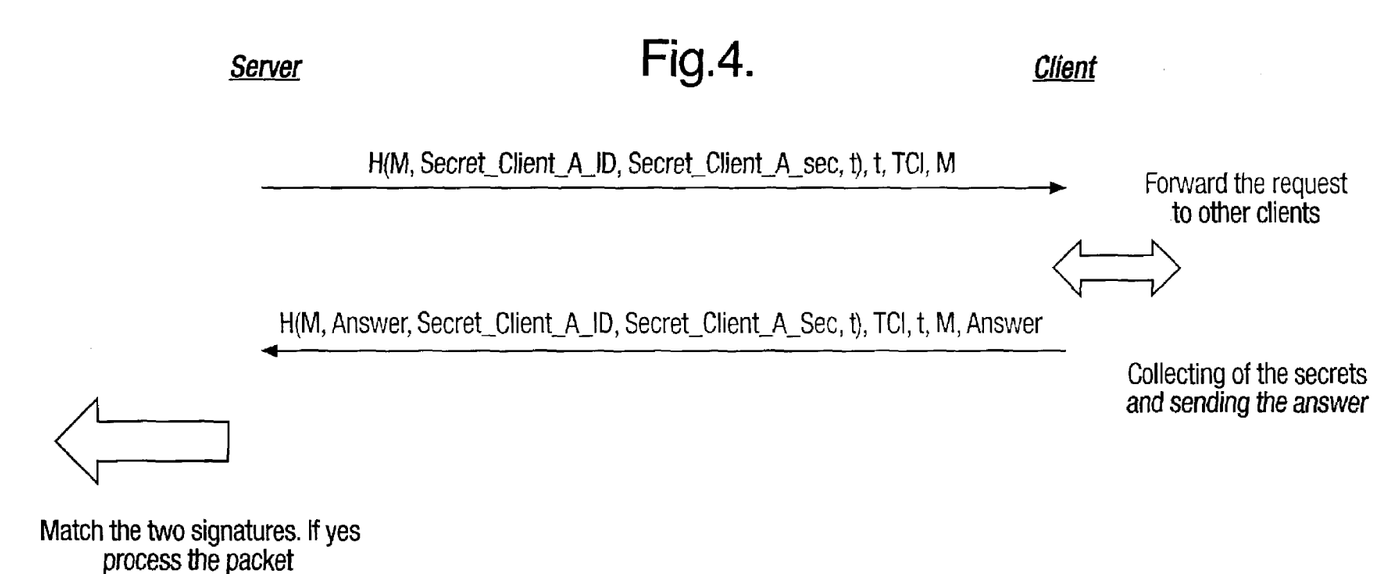
FIG. 4 shows schematically the exchange of messages between the authenticating server and client to be authenticated in a preferred embodiment of the present invention.

The server's authentication request message includes a server "signature" to allow it to be verified by the client receiving it, as otherwise a malicious user could use a forged request to flood a client and hence trigger a chain reaction. In the present embodiment, as shown in FIG. 4, this is done using a simple hash function which uses the secret client ID Secret_Client_A_ID for the client being authenticated (i.e. secret client ID sent to the client when the authentication information is distributed) and the authentication information Secret_Client_A_sec stored by that client. In the present embodiment, clients are unable to resolve more than one server authentication request each K-seconds, where K depends on the bandwidth of the network. This further increases security against flooding of the network.

The server also sends in its authentication request message a parameter to allow it to verify the response of the client. This is necessary because the server requests are stateless. In the present embodiment, the parameter sent by the server to authenticate the response of the client is a hash of the local server secret information Ka and the current time parameter t, and will be referred to as "time confidential information", TCI. However, other authentication parameters could be sent if desired. The client has to return this TCI with its response to the server and the server then uses that TCI to verify or otherwise the response of the client.

In the present embodiment, the response of the client to be authenticated to the server's authentication request is verified using two signatures. The first is the TCI discussed above, which allows the server to confirm that the client's answer is effectively in response to its authentication request. The second signature uses the client's verification information (i.e. secret client ID cookie) and its authentication information (i.e. client secret). This second signature allows the server to verify the user that has sent the message. Only if both signatures are matched, should the server process the message.

In the present embodiment, as shown in FIG. 4 the server will also time-out an authentication information response that takes too long. In other words, the client to be authenticated must respond within a predetermined time period, or its response is considered invalid.

This exchange of messages is shown in FIG. 4. The server's authentication request message to the client includes the message M, the TCI parameter and the current value of the time parameter t. It also includes the message M hashed with the verification information (Secret_Client_A_ID), the authentication information (Secret_Client_A_sec) and the current value of the time parameter t. The client's response to the server includes the TCI parameter sent by the server, the message M, the client's answer, and a hash of the message M, the client's answer, the verification information (Secret_Client_A_ID), the authentication information (Secret_Client_A_sec) and the current value of the time parameter t.

Of course, as will be appreciated by those skilled in the art and as illustrated in FIG. 4, in between these two messages, the client to be authenticated must ask the other clients for their authentication information and collect that authentication information for sending to the server. This exchange of messages will now be discussed.

When the client to be authenticated receives and verifies the server's authentication request, it requests the relevant authentication information from the other network clients indicated by the server. The exchange of messages with one of those other clients will now be described. The exchange of messages is essentially the same for each client from which authentication information is sought.

Figure 5:
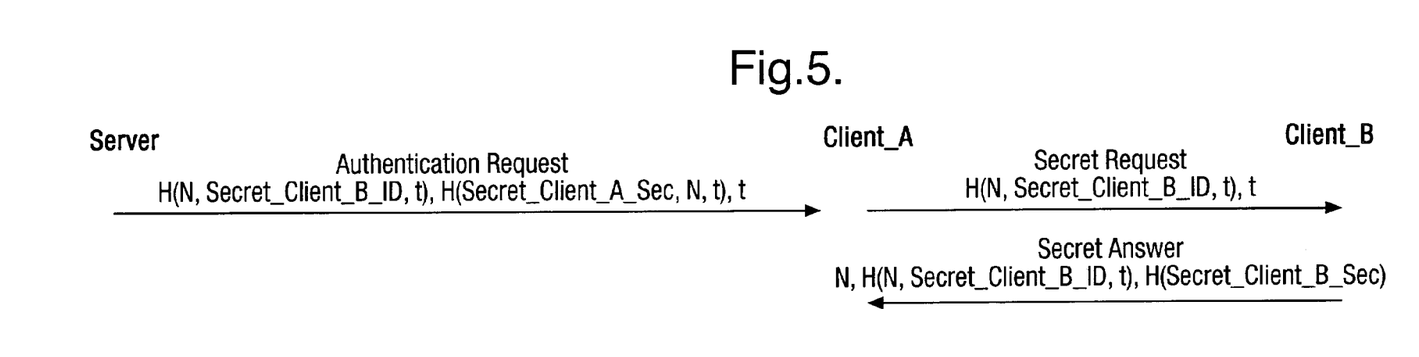
FIG. 5 shows schematically the exchange of messages when the client being authenticated requests authentication information from another network client in one preferred embodiment of the present invention.

FIG. 5 shows schematically this exchange of messages between the server, the client to be authenticated (client A in FIG. 5) and the client providing the authentication information (client B in FIG. 5).

When the client to be authenticated (client A) receives the authentication request from the server, he must ask client B (and the other clients) for their authentication information. This message must be verified, since client B would not normally know if client A is a legitimate user. Therefore verification is desirable as otherwise any user could potentially ask for, and obtain, client B's authentication information.

This verification is done in the present embodiment by means of a random number N. This random number is 64 bits long, although its size can be varied depending on the resources of the network entities.

As shown in FIG. 5, the server in its authentication request message provides to client A (i.e. the client to be authenticated) the random number N in a disguised form, and also further provides to client B the random number N in a different disguised form. In the present embodiment the disguised version of the random number N that is provided to client A comprises the hash of the random number N with client A's authentication information Secret_Client_A_sec and the current time parameter t. The disguised random number N provided to the client B comprises the hash of that random number with client B's verification information (Secret_Client_B_ID) and the current time parameter t.

Upon receipt of this authentication request message, client A passes an authentication information request on to client B, which request for the authentication information includes the disguised version of the random number N from the server that can be deciphered by the legitimate client B.

Upon receipt of this authentication information request, the client B firstly deciphers the random number N from the request. It does this by means of a "brute force" attack over the part of the message containing N by trying all possible values of N until it finds the correct value of its verification information (Secret_Client_B_ID) and the time parameter t in the message (both of which client B knows already). The value of N found to give the correct values for client B's verification information and the time parameter t is assumed to be the correct value of N.

This arrangement is sufficiently secure because of the secure properties of the hash function. It is also efficient because a hash is a low resource function. An attacker would not readily be able to determine N, because he would not know client B's verification information.

If client B verifies client A's request, it then returns to client A its reply, which comprises the random number N that it has derived, the disguised form of N sent to it (comprising the hash of the random number N, client B's verification information and the time parameter t), and the authentication information in the form of the hash of client B's secret information.

Upon receipt of this message, client A verifies it by checking the random number N returned by client B against its derived value of N, and upon verification accepts the hashed authentication information from client B as the authentication information to return to the server.

This exchange of messages is repeated with each relevant client indicated by the server until the client to be authenticated has collected all the authentication information requested by the server.

The client then returns that information to the server in an appropriate form. In the present embodiment this is done by the client to be authenticated making an XOR of all the authentication information that it receives and sending the result of that operation to the server. Of course, other arrangements could be used if desired.

Upon receipt of the message from the client to be authenticated, the server checks if the message is correct and, if so, authenticates the client. If the message is incorrect, then the server can take that as an indication that the client is malicious or that there are problems in the network.

The above process is repeated as appropriate to authenticate other clients.

Figure 6A:
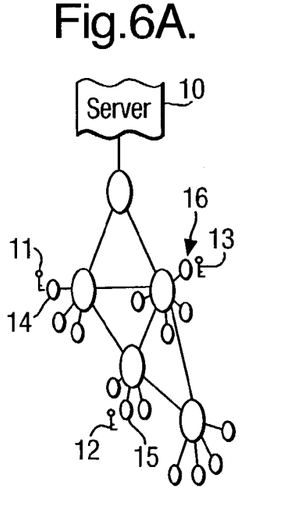
FIGS. 6A, 6B and 6C show schematically the exchange of messages in a preferred embodiment of the present invention.
Figure 6B:
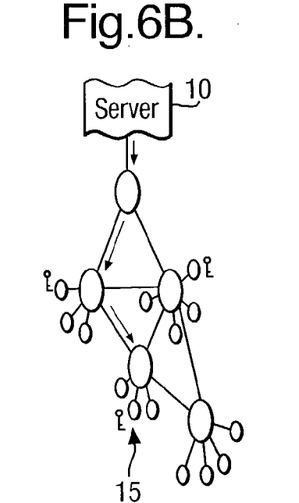
Figure 6C:
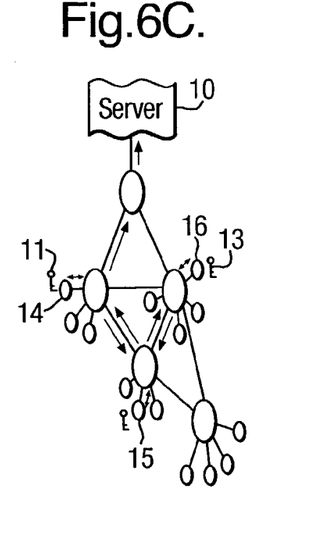

FIGS. 6A, 6B and 6C show schematically the overall method. As shown in FIG. 6A, the server 10 distributes appropriate authentication information 11, 12, 13 to the relevant clients 14, 15, 16 when a session is initialised. When it is desired to authenticate a particular client 15, then as shown in FIG. 6B the server 10 sends the appropriate authentication request to that client 15. In response to the authentication request, the client 15 asks the other clients 14, 16 for their authentication information 11, 13 which it collects and then returns to the server 10 as shown in FIG. 6C.

The table below summarises the messages exchanged in the above embodiment on an IP network.

| Action | Protocol | Information stored by the server | Security method used |
| --- | --- | --- | --- |
| Distribution of the authentication information | UDP | Client IP address, time parameter, local secret. | Cookie exchange, Time based method. |
| Server Request, Client Response | UDP | No information. | Hash signature. Time based signature for client response. |
| Communications between clients | TCP | | Problem resolution, Signature information from the server |
| Authentication information transmission | TCP (server) UDP (client) | | Hash function of real secret information. No encryption used. |

It can be seen from the above that in the present embodiment, when a server needs to authenticate a client, it hands out a server request to the client which asks the client for authentication information which it must obtain from another client. The client being authenticated then sends these requests to the client specified in the authentication request to obtain the authentication information from those clients. Once the client to be authenticated has received the relevant authentication information from the other clients, it returns it to the server and is authenticated or not accordingly.

In the above embodiment, the server communicates directly with the client to be authenticated. However, in another preferred embodiment, the server communicates with the client to be authenticated via an intermediate network entity. This intermediate network entity (which could, for example, be a router or firewall and should be a "trusted third party") acts to intercept an authentication request crossing the network and forwards a different authentication request to the client to be authenticated. This different authentication request is a modified version of the original authentication request. The client to be authenticated answers this different request as being the request from the server. The intermediate network entity intercepts the client's response and modifies it appropriately before returning it to the authenticating server.

This further enhances the security of the authentication process, as an attacker would also have to know the identity of the intermediate network entity via which authentication messages pass, even if they manage to intercept some of those messages. The intermediate network entity effectively acts as a "stepping stone" that makes identifying the authentication message path more difficult.

The present invention provides a relatively non-complex authentication procedure that does not have to rely on, for example, the use of cryptographic algorithms and shared keys for its security. The present invention instead relies primarily for its security on the principle that an attacker in the network cannot intercept all of the traffic used in the authentication process and thereby obtain sufficient authentication information to be authenticated.

The reason for this security can be appreciated by considering the number of different authentication information permutations that may be available to an authenticating network entity. If there are N network users, and each authentication request asks for secret information from J network entities, then the authenticating network entity can choose from C(N, J) possible combinations of authentication information, where $$C(N, J) = \frac{N!}{(N-J)! * J!}$$

Thus in a network of 100 users, with the authenticating network entity asking for authentication information from three other network entities in the authentication procedure, there are 161,700 different combinations of authentication information available to the authenticating network entity. Thus, even if, for example, an attacker has installed a sniffer on the network and knows 20% of the authentication information, the probability that the attacker can successfully fool the authenticating network entity into authenticating the attacker is only about 1%.

Thus the present invention provides a relatively secure and reliable process for authenticating network entities, without the need for additional security measures such as encryption.

Figure 7:
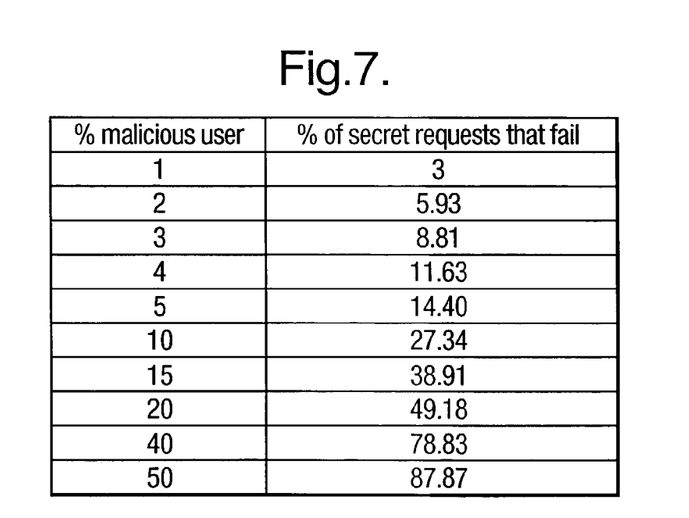
FIGS. 7 and 8 illustrate the effect of malicious users on the authentication process of a preferred embodiment of the present invention.
Figure 8:
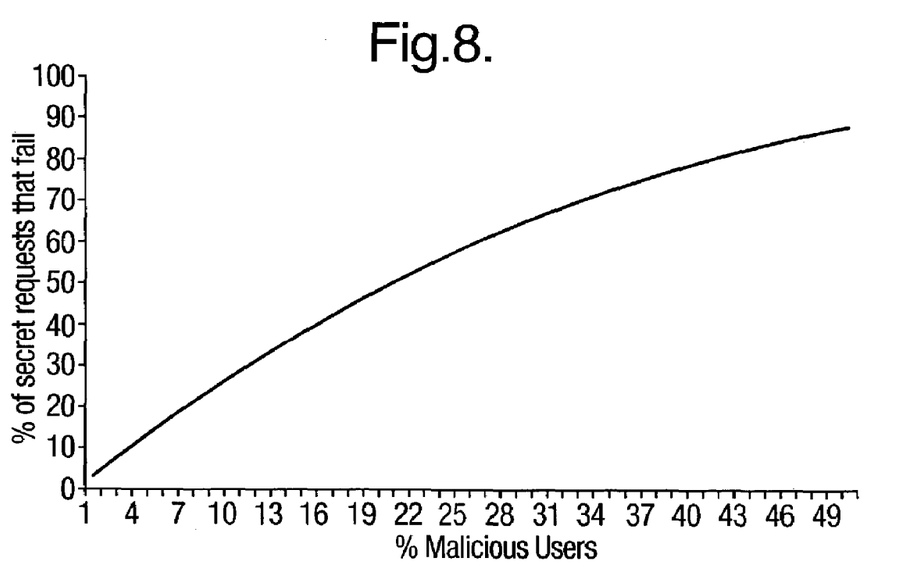

It is also appropriate to consider the performance of the authentication process of the present invention where there are malicious users, i.e. network entities that do not give the correct response to another network entity. FIG. 7 is a table, and FIG. 8 the corresponding graph, showing the percentage of authentication requests that fail given a particular percentage of malicious users for a network with 100 users and where each authentication request requires authentication information from three different users. It can be seen that in this network, if 10% of users are malicious, then 27% of authentication requests will fail. FIGS. 7 and 8 show that it may be desirable for the authentication process of the present invention to ask for authentication information from network entities which are known to be secure and not malicious.

The present invention is applicable to authentication in networks, such as computer and/or communications networks, generally. It works particularly well when an attacker is connected to a server using a spoofed address, as in that case the attacker can easily be detected with the authentication procedure of the present invention.

The present invention is particularly (although not exclusively) suitable for stateless networks, such as IP networks. It is particularly useful where there is a large number of network entities that can participate in the authentication process and there can be many authentication messages crossing the network using different paths. In such cases in particular, the large topology and stateless properties of the network (such as the Internet) can render it very difficult or unfeasible for an attacker to intercept ("sniff") a significant amount of authentication traffic (as there is, for example, no obvious strategic positions where a "sniffer" could be installed).

The authentication procedure of the present invention can also be used to, for example, monitor the behaviour of a network. This is because a failed authentication request can be an indication that the network has some problem, such as congestion at a particular part (e.g. router) in the network.

The process of the present invention could also be used in multicast networks, as the hierarchical structure of a multicast network could be used in accordance with the present invention in order to trust some multicast user.

What is claimed is:

1. A method of authenticating a client on a network used by plural network clients, the method comprising:
   an authenticating network entity instructing the client to be authenticated to obtain authentication information from at least two other network clients;
   the client to be authenticated obtaining the authentication information from said at least two other network clients and sending that authentication information to the authenticating network entity; and
   the authenticating network entity evaluating authenticity of the client to be authenticated on the basis of the authentication information it is sent;
   wherein said at least two other network clients are determined randomly.

2. The method of claim 1, wherein the authenticating network entity is a server of the network.

3. The method of claim 1, wherein the client to be authenticated comprises a client on the network.

4. The method of claim 1, wherein the authentication information comprises one or more pieces of information that is stored by said at least two other network clients.

5. The method of claim 4, wherein each piece of authentication information is only valid for a limited period of time.

6. The method of claim 1, further comprising at least one distributor network entity distributing said authentication information to said at least two other network clients.

7. The method of claim 6, wherein the authentication information is distributed by a plurality of distributor network entities.

8. The method of claim 6, wherein the authentication information is distributed by at least two authenticating network entities.

9. The method of claim 6, wherein the authentication information is distributed in plain text.

10. The method of claim 6, further comprising the distributor network entity first verifying the at least two other network clients that it is distributing the authentication information to, and then, once it has verified the at least two other network clients, transmitting the authentication information to the at least two other network clients.

11. The method of claim 10, wherein the network entity verification is done using a token exchange technique.

12. The method of claim 11, wherein the at least two other network clients store the token sent to them by the distributor network entity during the authentication information distribution process for future use.

13. The method of claim 1, further comprising the client to be authenticated verifying the authentication instruction received from the authenticating network entity before responding to that instruction.

14. The method of claim 1, further comprising the authenticating network entity including with the authentication instruction verification information that the client to be authenticated can return to the authenticating network entity with its response to the authentication instruction to allow the authenticating network entity to verify that response as being in answer to the authentication instruction.

15. The method of claim 14, further comprising the client to be authenticated returning its response to the authentication instruction to the authenticating network entity together with said verification information.

16. The method of claim 1, further comprising the client to be authenticated, once it has received the authentication instruction, sending authentication information request messages to the indicated at least two other network clients requesting from them the authentication information.

17. The method of claim 1, further comprising the authenticating network entity determining the time delay between its authentication instruction and the response from the client to be authenticated, and rejecting the response if the response is returned outside a predetermined period of time from the original instruction.

18. The method of claim 1, wherein the authentication takes place via an intermediate network entity which modifies the authentication process.

19. The method of claim 18, wherein the authentication instruction from the authenticating network entity is sent to the client to be authenticated via the intermediate network entity which modifies that instruction, and further comprising the client to be authenticated answering this modified instruction and returning its response, and the intermediate network entity intercepting the response and modifying it appropriately before returning it to the authenticating network entity.

20. A tangible computer program storage medium containing computer software code for performing the method of claim 1 when the program element is run on data processing hardware.

21. A tangible computer program storage medium containing computer software code for performing the method of claim 1 when the program element is run on data processing hardware.

22. A network comprising:
- an authenticating network entity comprising means for authenticating network clients, including:
- means for instructing a network client to be authenticated to obtain and send to it authentication information from at least two other network clients and
- means for evaluating authenticity of the network client to be authenticated on the basis of the authentication information it sends;
- said at least two other network clients each having means for storing authentication information and for sending that information to said network client to be authenticated;
- wherein said at least two other network clients are determined randomly.

23. The network of claim 22, wherein said network client to be authenticated having:
- means for receiving the authentication instruction from the authenticating network entity;
- means for, in response to such an instruction, seeking the authentication information from said at least two other network clients; and
- means for returning the authentication information to the authenticating network entity.

24. The network of claims 22, further comprising at least one distributor network entity comprising means for distributing authentication information to said at least two other network clients.

25. The network of claim 22, further comprising an intermediate network entity via which the authentication takes place, and which intermediate network entity modifies the authentication process.

26. The network of claim 25, wherein the intermediate network entity comprises:
- means for receiving and modifying the authentication instruction sent from the authenticating network entity;
- means for intercepting the response of the network client to be authenticated; and
- means for modifying that response appropriately before returning it to the authenticating network entity.

* * * * *